United States Patent
Shi et al.

(10) Patent No.: US 11,013,018 B2
(45) Date of Patent: May 18, 2021

(54) DATA MULTIPLEXING APPARATUS AND METHOD AND COMMUNICATION SYSTEM

(71) Applicant: FUJITSU LIMITED, Kawasaki (JP)

(72) Inventors: Yulong Shi, Beijing (CN); Lianhai Wu, Beijing (CN); Meiyi Jia, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 114 days.

(21) Appl. No.: 16/412,903

(22) Filed: May 15, 2019

(65) Prior Publication Data
US 2019/0268919 A1 Aug. 29, 2019

Related U.S. Application Data

(63) Continuation of application No. PCT/CN2016/110311, filed on Dec. 16, 2016.

(51) Int. Cl.
*H04W 72/12* (2009.01)
*H04L 29/08* (2006.01)
*H04L 5/00* (2006.01)

(52) U.S. Cl.
CPC ........... *H04W 72/1247* (2013.01); *H04L 5/00* (2013.01); *H04L 69/323* (2013.01); *H04W 72/1263* (2013.01)

(58) Field of Classification Search
CPC ..... H04L 1/1819; H04L 5/0064; H04L 67/12; H04W 4/70; H04W 72/042; H04W 72/044; H04W 72/0446; H04W 72/0453
See application file for complete search history.

(56) References Cited

U.S. PATENT DOCUMENTS

2012/0057547 A1* 3/2012 Lohr .................. H04L 5/0064
370/329
2013/0343314 A1* 12/2013 Tiirola ............... H04L 5/0051
370/329

(Continued)

FOREIGN PATENT DOCUMENTS

CN 105979597 A 9/2016
CN 106102180 A 11/2016

(Continued)

OTHER PUBLICATIONS

Extended European Search Report issued by the European Patent Office for corresponding European Patent Application No. 16924046.2 dated Jun. 23, 2020.

(Continued)

*Primary Examiner* — Mewale A Ambaye
(74) *Attorney, Agent, or Firm* — Myers Wolin, LLC

(57) ABSTRACT

A data multiplexing apparatus and method and a communication system. The data multiplexing method includes: for a logical channel needing to be performed data multiplexing, determining one or more physical layer resources for multiplexing data from a plurality of physical layer resources supported by the logical channel according to priorities of the plurality of physical layer resources; and multiplexing the data of the logical channel into the determined physical layer resources. Hence, when the user equipment has data of a plurality of service types needing to be transmitted, the use of the resources by the user equipment may be kept in consistence with the scheduling intention of the network equipment.

8 Claims, 8 Drawing Sheets

(56) References Cited

U.S. PATENT DOCUMENTS

| | | | |
|---|---|---|---|
| 2017/0164363 A1 | 6/2017 | Zang et al. | |
| 2018/0160445 A1* | 6/2018 | Babaei | H04W 72/14 |
| 2018/0288631 A1* | 10/2018 | Wei | H04W 24/02 |
| 2019/0075563 A1* | 3/2019 | Babaei | H04W 72/10 |
| 2020/0267729 A1* | 8/2020 | Kim | H04W 76/14 |
| 2020/0267753 A1* | 8/2020 | Adjakple | H04W 72/1226 |

FOREIGN PATENT DOCUMENTS

| | | |
|---|---|---|
| CN | 106231614 A | 12/2016 |
| JP | 2012-525030 A | 10/2012 |
| JP | 2017-529782 A | 10/2017 |
| WO | 2008/049028 A1 | 4/2008 |
| WO | 2012/103932 A1 | 8/2012 |
| WO | 2016029736 A1 | 3/2016 |

OTHER PUBLICATIONS

Huawei Hisilicon: "LCP with Multiple Numerologies", 3GPP Draft; R2-167575, 3rd Generation Partnership Project (3GPP), Mobile Competence Centre; 650 Route Des Lucioles ; F-06921 Sophia-Antipolis Cedex France vol. RAN WG2, No. Reno, Nevada, US; Nov. 14, 2016-Nov. 18, 2016, Nov. 13; [Cited in Extended European Search Report issued by the European Patent Office for corresponding European Patent Application No. 16924046.2 dated Jun. 23, 2020. 2016].

Samsung: "Logical Channel Prioritization Considering Multiple Numerologies and/or TTIs", 3GPP Draft; R2-168040, 3rd Generation Partnership Project (3GPP), Mobile Competence Centre; 650, Route Des Lucioles ; F-06921 Sophia-Antipolis Cedex France vol. RAN WG2, No. Reno, USA; Nov. 14, 2016-Nov. 18, 2016, Nov. 13, 2016; [Cited in Extended European Search Report issued by the European Patent Office for corresponding European Patent Application No. 16924046.2 dated Jun. 23, 2020].

Notice of Reasons for Refusal by the Japan Patent Office issued for corresponding Japanese Patent Application No. 2019-525964 dated Jul. 14, 2020 with an English translation.

International Search Report issued by the State Intellectual Property Office of the P.R. China for corresponding International Patent Application No. PCT/CN2016/110311, dated Aug. 25, 2017, with an English translation.

* cited by examiner

DATA MULTIPLEXING APPARATUS AND METHOD AND COMMUNICATION SYSTEM

CROSS REFERENCE TO RELATED APPLICATIONS

This application is a continuation application of International Application PCT/CN2016/110311 filed on Dec. 16, 2016, the entire contents of which are incorporated herein by reference.

TECHNICAL FIELD

This disclosure relates to the field of communication technologies, and in particular to a data multiplexing apparatus and method and a communication system.

BACKGROUND

Issues related to next-generation wireless communication systems are under investigation in the 3rd Generation Partnership Project (3GPP) to meet demands of new services, including those that support a plurality of different demands, such as ultra-reliable low latency communication (URLLC), enhanced mobile broadband (eMBB), and massive machine-type communications (mMTCs). These different types of services have different requirements for data rates, delay, and transmission reliabilities.

In a next generation wireless communication system, in order to support various service demands, a plurality of transmission technologies of different subcarrier spacings and/or symbol lengths are supported at a physical layer, which may be referred to as having different numerologies. For example, a user equipment (UE) may simultaneously use a plurality of physical layer transmission technologies for data transmission, and a plurality of different services may also be multiplexed onto resources of the same physical layer transmission technology (hereinafter referred to as physical layer resources) for transmission.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In an original long-term evolution (LTE) system, a single physical layer transmission technology is only supported, and a logical channel multiplexing function only supports multiplexing data of different service types into a single physical layer resource.

In the next-generation wireless communication system, when a user equipment has data of a plurality of service types at the same time needing to be transmitted, a network equipment may simultaneously schedule a plurality of types of physical layer resources for data transmission of the user equipment. At this case, the logical channel multiplexing function of the user equipment needs to multiplex data of different service types on a plurality of different logical channels into a plurality of different physical layer resources. At this case, the physical layer transmission technology allowed to be used by each logical channel is configured by the network equipment or specified in a protocol in advance. The logical channel that each physical layer transmission technology may carry may also be configured by the network equipment or specified in advance in the protocol. And priorities of processing between different logical channels may be configured by the network equipment.

However, it was found by the inventors that data of the same logical channel may be multiplexed into a plurality of physical layer resources; and how to determine physical layer resources for multiplexing the data from a plurality of physical layer resources supported by the logical channel is not concerned in the relevant art. Therefore, when the user equipment has data of a plurality of service types needing to be transmitted, it cannot be ensured that the use of the resources by the user equipment may be kept in consistence with the scheduling intention of the network equipment.

Embodiments of this disclosure provide a data multiplexing apparatus and method and a communication system, in which physical layer resources for multiplexing data are determined according to priorities of a plurality of physical layer resources supported by a logical channel. Hence, when the user equipment has data of a plurality of service types needing to be transmitted, the use of the resources by the user equipment may be kept in consistence with the scheduling intention of the network equipment.

According to a first aspect of the embodiments of this disclosure, there is provided a data multiplexing method, including:

for a logical channel needing to be performed data multiplexing, determining one or more physical layer resources for multiplexing data from a plurality of physical layer resources supported by the logical channel according to priorities of the plurality of physical layer resources; the logical channel supports to multiplex data of different service types into the plurality of physical layer resources; and multiplexing the data of the logical channel into the determined physical layer resources.

According to a second aspect of the embodiments of this disclosure, there is provided a data multiplexing apparatus, including:

a physical layer resource determining unit configured to, for a logical channel needing to be performed data multiplexing, determine one or more physical layer resources for multiplexing data from a plurality of physical layer resources supported by the logical channel according to priorities of the plurality of physical layer resources; the logical channel supports to multiplex data of different service types into the plurality of physical layer resources; and a data multiplexing unit configured to multiplex the data of the logical channel into the determined physical layer resources.

According to a third aspect of the embodiments of this disclosure, there is provided a configuration method for data multiplexing, including:

configuring one or more physical layer resources for a logical channel of a user equipment;

the logical channel supports to multiplex data of different service types into a plurality of physical layer resources; and configuring the physical layer resources with priorities or indicating priorities to the physical layer resources, so that the user equipment determines one or more physical layer resources for multiplexing data from the plurality of physical layer resources according to the priorities.

According to a fourth aspect of the embodiments of this disclosure, there is provided a configuration apparatus for data multiplexing, including:

a resource configuring unit configured to configure one or more physical layer resources for a logical channel of a user equipment; the logical channel supports to multiplex data of different service types into a plurality of physical layer resources; and a priority configuring unit configured to configure the physical layer resources with priorities or indicate priorities to the physical layer resources, so that the user equipment determines one or more physical layer resources for multiplexing data from the plurality of physical layer resources according to the priorities.

According to a fifth aspect of the embodiments of this disclosure, there is provided a communication system, including:

a user equipment including the data multiplexing apparatus as described in the second aspect; and a network equipment including the configuration apparatus for data multiplexing described in the fourth aspect.

An advantage of the embodiments of this disclosure exists in that physical layer resources for multiplexing data are determined according to priorities of a plurality of physical layer resources supported by a logical channel. Hence, when the user equipment has data of a plurality of service types needing to be transmitted, the use of the resources by the user equipment may be kept in consistence with the scheduling intention of the network equipment.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals assign corresponding parts throughout the several views and may be used to assign like or similar parts in more than one embodiment.

DETAILED DESCRIPTION

Figure 1:
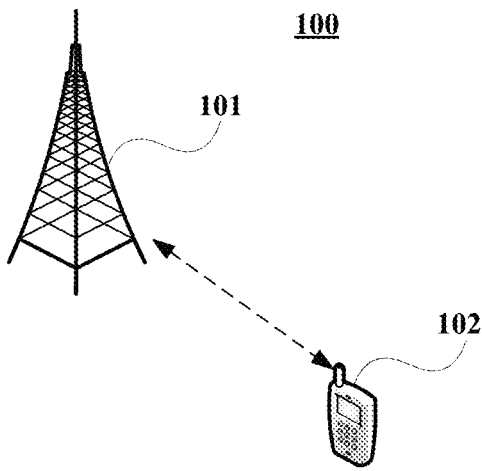
FIG. 1 is a schematic diagram of a communication system of an embodiment of this disclosure.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the scope of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network equipment", for example, refers to a device in a communication system that accesses a terminal device to the communication network and provides services for the terminal device. The network equipment may include but not limited to the following devices: a base station (BS), an access point (AP), a transmission reception point (TRP), a broadcast transmitter, a mobile management entity (MME), a gateway, a server, a radio network controller (RNC), a base station controller (BSC), etc.

Wherein, the base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network equipment. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a user equipment and a network equipment are taken as examples is schematically shown. As shown in FIG. 1, the communication system 100 may include a network equipment 101 and a user equipment 102 (for the sake of simplicity, FIG. 1 shall be described by taking only one user equipment as an example).

In the embodiment of this disclosure, existing traffics or traffics that may be implemented in the future may be performed between the network equipment 101 and the user equipment 102. For example, such traffics may include but not limited to an enhanced mobile broadband (eMBB), massive machine type communication (MTC), and ultra-reliable and low-latency communication (URLLC), etc.

The user equipment 102 may transmit data to the network equipment 101. And the network equipment 101 may receive data transmitted by one or more user equipments 102, and feed back information (such as acknowledgement (ACK)/non-acknowledgement (NACK)) to the user equipments 102.

Following description shall be given by taking that a network equipment in a communication system is taken as a data receiving device and a user equipment is taken as a data transmitting device as an example. However, this disclosure is not limited thereto, and the transmitting device and/or the receiving device may also be other devices.

Embodiment 1

Figure 2:
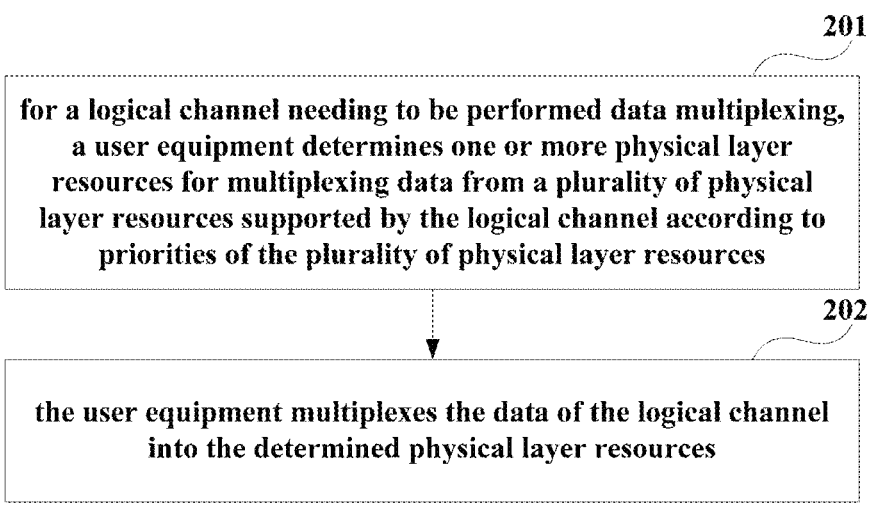
FIG. 2 is a schematic diagram of the data multiplexing method of Embodiment 1 of this disclosure.

These embodiments of this disclosure provide a data multiplexing method, applicable to a data transmitting device (such as a user equipment) side. FIG. 2 is a schematic diagram of the data multiplexing method of the embodiment of this disclosure, which shall be schematically described from a user equipment side. As shown in FIG. 2, the data multiplexing method includes:

201: for a logical channel needing to be performed data multiplexing, a user equipment determines one or more physical layer resources for multiplexing data from a plurality of physical layer resources supported by the logical channel according to priorities of the plurality of physical layer resources; the logical channel supports to multiplex data of different service types into the plurality of physical layer resources; and 202: the user equipment multiplexes the data of the logical channel into the determined physical layer resources.

In an embodiment, different physical layer resources may have different numerologies, and the different numerologies may include different subcarrier spacings and/or symbol lengths; however, this disclosure is not limited thereto. For example, different physical layer resources may also have the same numerology.

Figure 3:
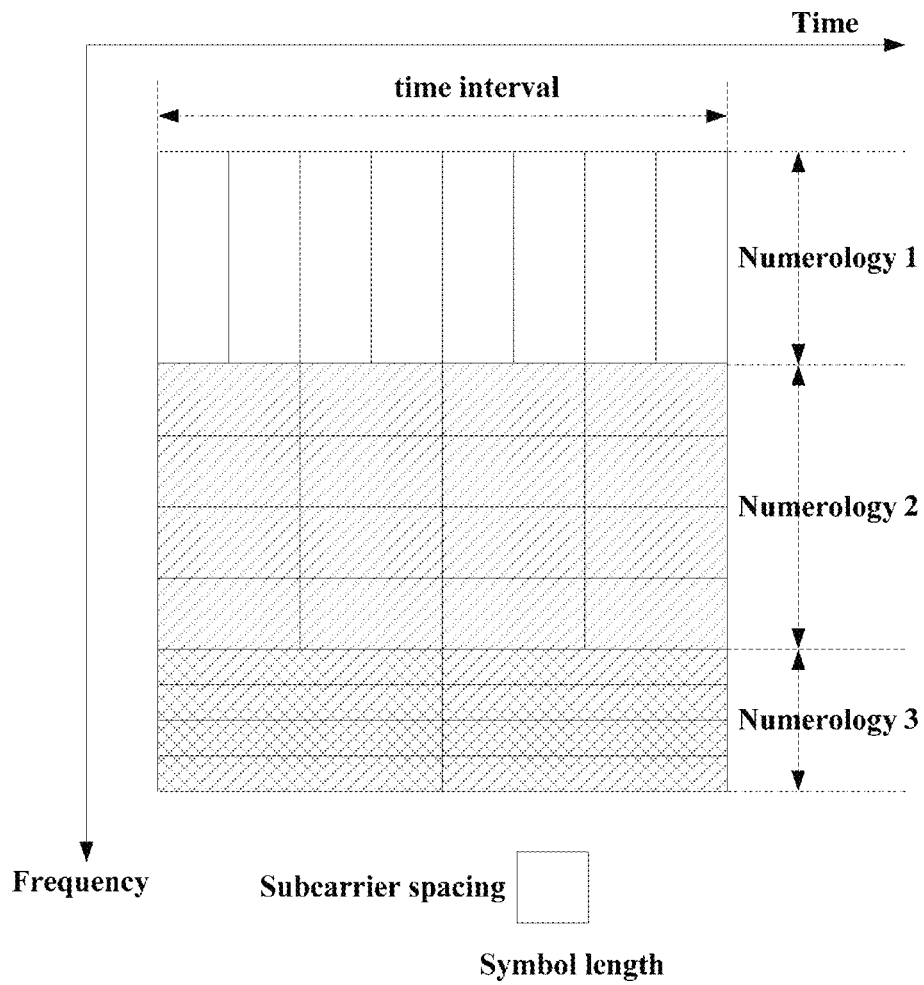
FIG. 3 is a schematic diagram of frame structures in a plurality of numerologies of Embodiment 1 of this disclosure.

FIG. 3 is a schematic diagram of frame structures in a plurality of numerologies according to the embodiment of this disclosure. As shown in FIG. 3, within a certain time interval (such a subframe length), time-frequency resources may have a plurality of numerologies (such as numerology 1, numerology 2 and numerology 3 shown in FIG. 3). There are different subcarrier spacings and symbol lengths in different numerologies. In a future ultra-large bandwidth system, a plurality of numerologies may coexist, and different numerologies may occupy an independent frequency portion or share a frequency portion.

The numerologies are schematically described above by taking that there are different subcarrier spacings and/or symbol lengths in different numerologies as an example. However, this disclosure is not limited thereto; for example, different numerologies may have other different parameters. Regarding the name of the numerology, this disclosure is not limited thereto, and may also be, for example, a mode, and a pattern, etc.

The processing of a logical channel needing to be performed data multiplexing is illustrated above. In the embodiments of this disclosure, the logical channel may be one or more, and a logical channel (such as each logical channel) may support multiplexing data of different service types into a plurality of physical layer resources. And for a plurality of logical channels needing to be performed data multiplexing, they may be processed one by one according to priorities of the logical channels.

In an embodiment, when there exist data needing to be transmitted in buffers of a plurality of logical channels, according to priorities of different logical channels (for example, they have already been configured by the network equipment), data of logical channels with higher priorities may be preferentially performed multiplexing. For example, the multiplexing of logical channels with lower priorities is performed only when demands of the logical channels with higher priorities for data transmission are satisfied.

Figure 4:
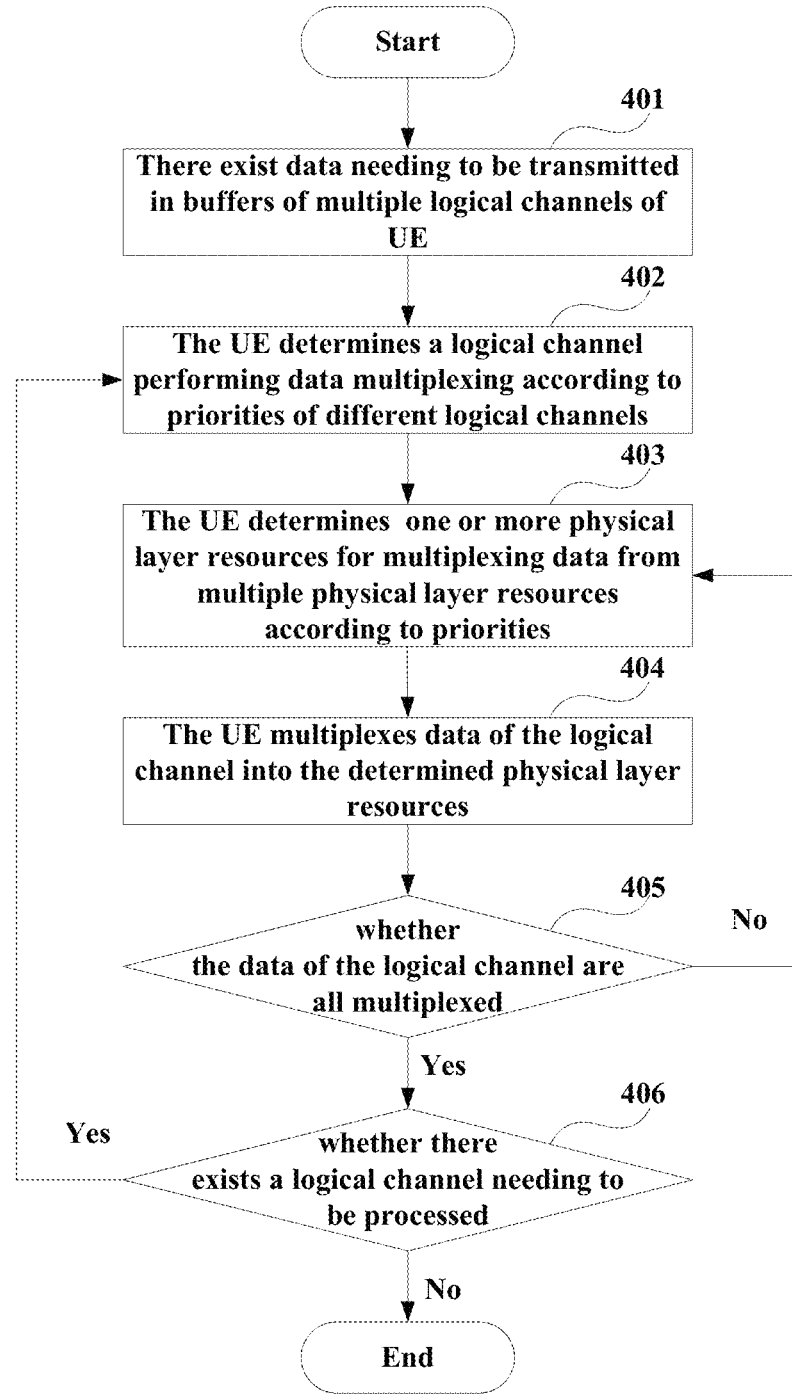
FIG. 4 is another schematic diagram of the data multiplexing method of Embodiment 1 of this disclosure.

FIG. 4 is another schematic diagram of the data multiplexing method of the embodiment of this disclosure, in which the method is schematically described further from a prospective of the user equipment. As shown in FIG. 4, the data multiplexing method includes:

401: there exist data needing to be transmitted in buffers of a plurality of logical channels of the user equipment.

402: the user equipment determines a logical channel performing data multiplexing according to priorities of different logical channels.

For example, there exists data needing to be transmitted in buffers of three logical channels LC1, LC2 and LC3; priorities of the three logical channels LC1, LC2 and LC3 have been preconfigured by the network equipment. The user equipment may determine a logical channel with a highest priority (such as LC2), and execute the following operations for the determined logical channel (such as LC2).

403: the user equipment determines one or more physical layer resources for multiplexing data from a plurality of physical layer resources according to priorities of the plurality of physical layer resources supported by the logical channel.

In an embodiment, the priorities of the physical layer resources may be configured by the network equipment, or may be predefined in a protocol or a standard, or may be indicated by scheduling information of the physical layer resources, and reference may be made to those described later for a particular implementation.

For example, four physical layer resources PR1, PR2, PR3 and PR4 are supported in LC2; priorities of the four physical layer resources PR1, PR2, PR3 and PR4 have been configured by the network equipment via signaling (for example, they are configured according to time lengths of the physical layer resources, which may be ranked as PR3, PR1, PR4, PR2 in a descending order of the priorities). And the user equipment may determine physical layer resource PR3 with the highest priority from the four physical layer resources PR1, PR2, PR3, and PR4 (for example, the time length of the PR3 is the shortest).

404: the user equipment multiplexes data of the logical channel into the determined physical layer resources.

405: the user equipment determines whether the data of the logical channel are all multiplexed; if yes, executing operation 406; otherwise, executing operation 403 to again determine the physical layer resource for multiplexing the data.

In an embodiment, for example, the data of the logical channel may be preferentially multiplexed into the physical layer resource with a higher priority; and the data of the logical channel are multiplexed into the physical layer resource with a lower priority only when the physical layer resource with a higher priority is used up.

For example, when PR3 is used up but LC2 still has data needing to be multiplexed, PR1 with a secondary priority may be determined, and remaining data on LC2 may be multiplexed into PR1.

406: the user equipment determines whether there still exists a logical channel needing to be processed; if yes, continuing to execute operation 402 to determine a next logical channel performing data multiplexing.

For example, after LC2 is processed, LC1 with a secondary priority may be processed according to the above operations.

It should be noted that the embodiment of this disclosure is only illustrated in FIG. 4; however, this disclosure is not limited thereto. For example, an order of execution of the operations may be appropriately adjusted; and furthermore, some other operations may be added, or some of these operations may be reduced. And appropriate variants may be made by those skilled in the art according to what is described above, without being limited to the disclosure contained in the above figure.

Configuration, definitions and indication of the priorities of the physical layer resources shall be illustrated below.

In an embodiment, the network equipment may configure priorities of a plurality of physical layer resources corresponding to one or more logical channels (or service types, or radio connections) via higher layer signaling (such as radio resource control (RRC) signaling).

For example, a service type may correspond to a plurality of radio connections, one radio connection may correspond to a plurality of logical channels, and configuration may be performed by taking a logical channel as a granularity, or configuration may be performed by taking a radio connection as a granularity (for example, configurations of all logical channels under the radio connection are identical), or configuration may be performed by taking a service type as a granularity (for example, configurations of all logical channels under the service type are identical).

In another embodiment, the network equipment may configure priorities of corresponding a plurality of physical layer resources while establishing a logical channel (or a service type, or a radio connection).

In a further embodiment, priorities of a plurality of physical layer resources corresponding to one or more logical channels (or service types, or wireless connections) may be predefined in a protocol or a standard.

In yet another embodiment, the priorities of the physical layer resources may also be indicated by scheduling information of the physical layer resources. In particular, a priority to which each physical layer resource belongs may be dynamically indicated by scheduling information in a physical downlink control channel (PDCCH) transmitted by the network equipment. For example, a priority field may be added in downlink control information (DCI) to denote the priority of the physical layer resource.

It should be noted that the above various embodiments may be executed independently. For example, the network equipment does not use signaling to configure the priorities of PR1, PR2, PR3 and PR4, rather, it indicates (respectively or jointly) the priorities of PR1, PR2, PR3 and PR4 in the DCI of the PDCCH.

However, this disclosure is not limited thereto, and the above embodiments may be executed in a combined manner. For example, the network equipment may first configure the priorities of PR1, PR2, PR3 and PR4 by using signaling, then indicate (respectively or jointly) the priorities of PR1, PR2, PR3 and PR4 in the DCI of the PDCCH, and change the priorities configured by using the signaling. Or, the physical layer resources are first indicated by using the DCI of the PDCCH, and then the indicated priorities are changed via the signaling.

The foregoing only schematically illustrates the configuration manners of the priorities of the physical layer resources in the embodiment of this disclosure; however, this disclosure is not limited thereto. For example, the scheduling information is not limited to the DCI in the PDCCH, and may be other information in other control channels. Contents of the configuration of the priorities of the physical layer resources shall be illustrated below.

In an embodiment, the priorities of the plurality of physical layer resources may be configured according to time lengths of the physical layer resources. The time lengths in this embodiment may refer to a duration length of a physical layer resource in the time domain. The time length includes, but is not limited to the following forms: a transmission time interval (TTI) length of the physical layer resource; the number of symbols (such as orthogonal frequency division multiplexing (OFDM) symbols) occupied by the physical layer resource, and an absolute time length occupied by the physical layer resource, for example, by taking a millisecond as a unit.

In one embodiment, a priority may be configured or defined for a value of a time length of a physical layer resource (such as each physical layer resource).

For example, for a logical channel (or a service type, or a radio connection), priorities of a plurality of available physical layer resources may be defined as follows:

| Values of time lengths of resources | Priorities |
| --- | --- |
| TTI = 1 ms/14 OFDM symbols | 1 |
| TTI = 0.5 ms/7 OFDM symbols | 2 |
| TTI = 0.2 ms/3 OFDM symbols | 3 |
| TTI = 0.05 ms/1 OFDM symbol | 5 |
| TTI = 0.1 ms/2 OFDM symbols | 6 |

For example, the configuration information may include a value of a time length and a corresponding priority.

In another embodiment, a priority may be configured or defined for an index corresponding to a value of a time length of a physical layer resource (such as each physical layer resource).

For example, for a logical channel (or a service type, or a radio connection), priorities of resources of a plurality of available physical layer transmission techniques may be defined as follows:

| Indices | Values of time lengths of resources | Priorities |
| --- | --- | --- |
| 0 | TTI = 1 ms/14 OFDM symbols | 1 |
| 1 | TTI = 0.5 ms/7 OFDM symbols | 2 |
| 2 | TTI = 0.2 ms/3 OFDM symbols | 3 |
| 4 | TTI = 0.05 ms/1 OFDM symbol | 5 |
| 3 | TTI = 0.1 ms/2 OFDM symbols | 6 |

For example, the configuration information may include an index of a value of a time length and a corresponding priority.

In another embodiment, a priority may be configured or defined for a value range of a time length of a physical layer resource (such as each physical layer resource).

For example, for a logical channel (or a service type, or a radio connection), priorities of resources of a plurality of available physical layer transmission techniques may be defined as follows:

| Value ranges of time lengths of resources | Priorities |
| --- | --- |
| 0.5 ms ≤ TTI < 1 ms/7~14 OFDM symbols | 1 |
| 0.2 ms ≤ TTI < 0.5 ms/3~7 OFDM symbols | 2 |
| 0.1 ms ≤ TTI < 0.2 ms/2~3 OFDM symbols | 3 |
| TTI < 0.05 ms/less than 1 OFDM symbol | 5 |
| 0.05 ms ≤ TTI < 0.1 ms/1~2 OFDM symbols | 6 |

For example, the configuration information may include a value range of a time length and a corresponding priority.

In another embodiment, a priority may be configured or defined for an index corresponding to the value range of the time length of a physical layer resource (such as each physical layer resource).

For example, for a logical channel (or a service type, or a radio connection), priorities of resources of a plurality of available physical layer transmission techniques may be defined as follows:

| Indices | Value ranges of time lengths of resources | Priorities |
| --- | --- | --- |
| 0 | 0.5 ms ≤ TTI < 1 ms/7~14 OFDM symbols | 1 |
| 1 | 0.2 ms ≤ TTI < 0.5 ms/3~7 OFDM symbols | 2 |
| 2 | 0.1 ms ≤ TTI < 0.2 ms/2~3 OFDM symbols | 3 |
| 4 | TTI < 0.05 ms/less than 1 OFDM symbol | 5 |
| 3 | 0.05 ms ≤ TTI < 0.1 ms/1~2 OFDM symbols | 6 |

For example, the configuration information may include an index of a value range of a time length and a corresponding priority.

In another embodiment, a priority may be configured or defined according to a sort of sizes of time lengths of the physical layer resources.

For example, for a logical channel (or a service type, or a radio connection), the shorter time lengths of a plurality of available physical layer resources are, the higher their priorities are, and vice versa.

It should be noted that the embodiments of this disclosure are only illustrated above. However, this disclosure is not limited thereto, and appropriate modifications may be made by those skilled in the art according to the above contents, without being only limited to those contained in the above embodiments.

In an embodiment, priorities of data multiplexing between a plurality of physical layer resources may be configured or defined or indicated to determine a processing priority when data of a logical channel are multiplexed into the plurality of physical layer resources. Performing configuration of the priorities according to the duration lengths of the physical layer resources may fully take different transmission delay features of different physical layer resources into account, which may better match delay demands of different services.

It can be seen from the above embodiments that physical layer resources for multiplexing data are determined according to priorities of a plurality of physical layer resources supported by a logical channel. Hence, when the user equipment has data of a plurality of service types needing to be transmitted, the use of the resources by the user equipment may be kept in consistence with the scheduling intention of the network equipment.

Embodiment 2

These embodiments of this disclosure provide a configuration method for data multiplexing, applicable to a data receiving device (such as a network equipment) side, with contents identical to those in Embodiment 1 being not going to be described herein any further.

Figure 5:
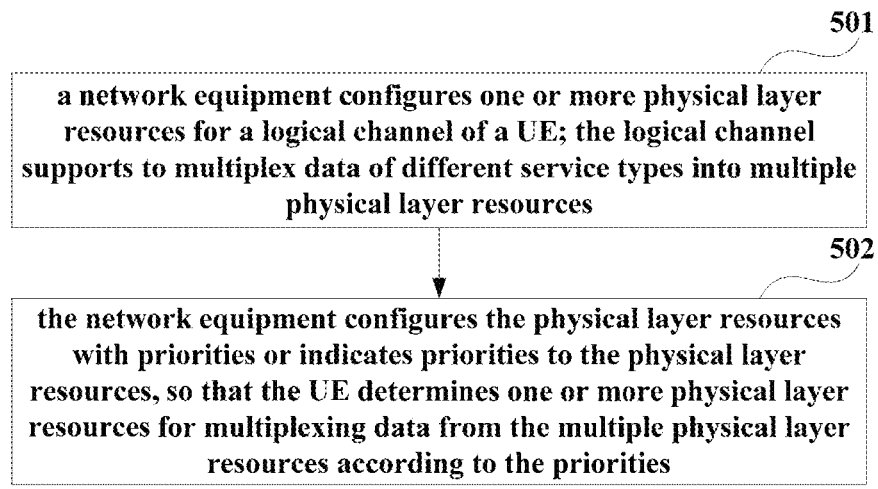
FIG. 5 is a schematic diagram of the configuration method for data multiplexing of Embodiment 2 of this disclosure.

FIG. 5 is a schematic diagram of the configuration method for data multiplexing of the embodiment of this disclosure, which shall be schematically described from a network equipment side. As shown in FIG. 5, the configuration method includes:

501: the network equipment configures one or more physical layer resources for a logical channel of a user equipment; the logical channel supports to multiplex data of different service types into a plurality of physical layer resources; and

502: the network equipment configures the physical layer resources with priorities or indicates priorities to the physical layer resources, so that the user equipment determines one or more physical layer resources for multiplexing data from the plurality of physical layer resources according to the priorities.

In an embodiment, different physical layer resources may have different numerologies, and the different numerologies include different subcarrier spacings and/or symbol lengths; however, this disclosure is not limited thereto, and different physical layer resources may also have identical numerologies.

In one embodiment, the priorities of the physical layer resources may be configured via signaling.

Figure 6:
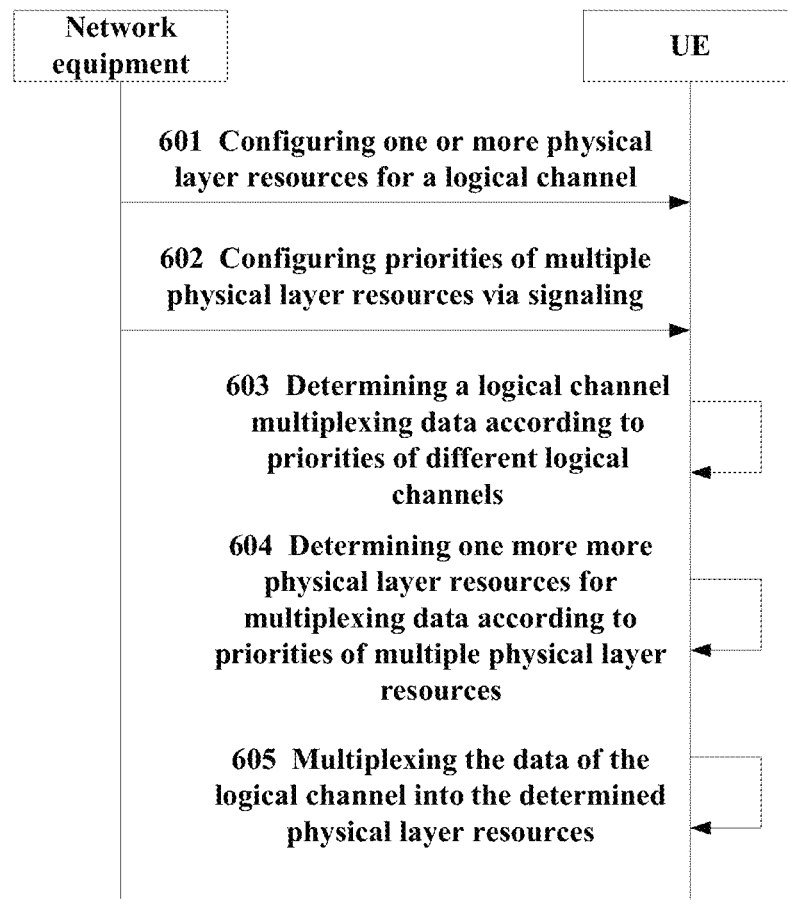
FIG. 6 is a schematic diagram of the data multiplexing method of Embodiment 2 of this disclosure.

FIG. 6 is a schematic diagram of a data multiplexing method of the embodiment of this disclosure, which shall be schematically described from the network equipment side and the user equipment side. As shown in FIG. 6, the method includes:

601: the network equipment configures one or more physical layer resources for the logical channel of the user equipment; the logical channel supports multiplexing data of different service types into a plurality of physical layer resources;

602: the network equipment configures priorities of the plurality of physical layer resources corresponding to one or more logical channels (or service types or radio connections) by signaling;

603: the user equipment determines a logical channel performing data multiplexing according to priorities of different logical channels when there exist data in buffers of different logical channels needing to be transmitted;

604: for a determined logical channel, the user equipment determines one or more physical layer resources for multiplexing data according to priorities of the plurality of physical layer resources supported by the determined logical channel; and 605: the user equipment multiplexes the data of the logical channel into the determined physical layer resources.

In another embodiment, the network equipment may configure priorities of the corresponding a plurality of physical layer resources while establishing a logical channel or a service type or a radio connection.

Figure 7:
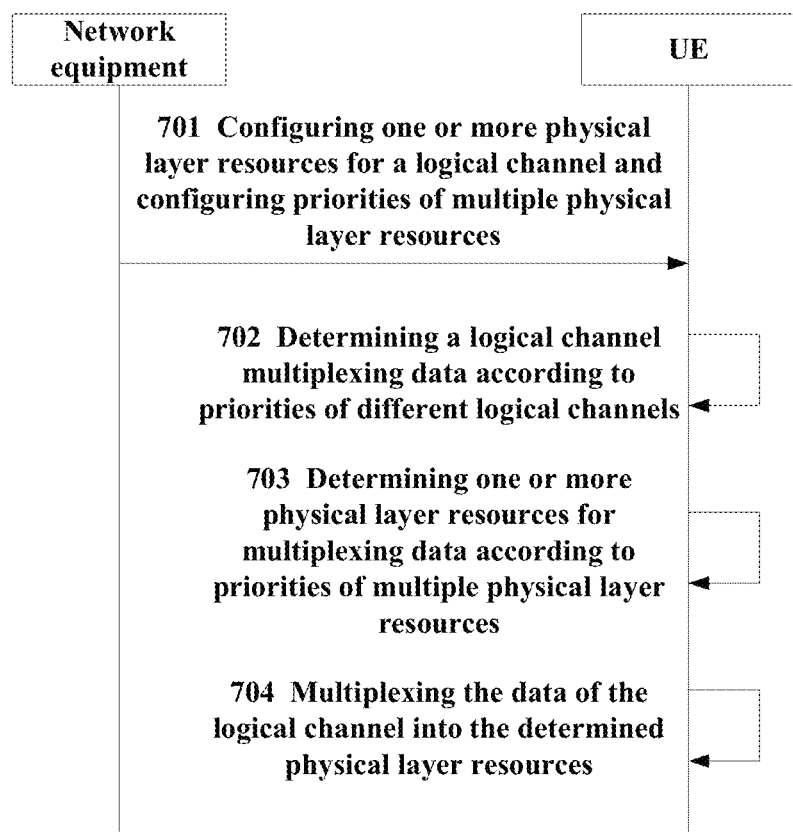
FIG. 7 is another schematic diagram of the data multiplexing method of Embodiment 2 of this disclosure.

FIG. 7 is another schematic diagram of the data multiplexing method of the embodiment of this disclosure, which shall be schematically described from the network equipment side and the user equipment side. As shown in FIG. 7, the method includes:

701: the network equipment configures one or more physical layer resources for the logical channel of the user equipment and configuring priorities of the physical layer resources; the logical channel supports multiplexing data of different service types into a plurality of physical layer resources;

702: the user equipment determines a logical channel performing data multiplexing according to priorities of different logical channels when there exist data in buffers of different logical channels needing to be transmitted;

703: for a determined logical channel, the user equipment determines one or more physical layer resources for multiplexing data on the logical channel according to priorities of supported a plurality of physical layer resources; and 704: the user equipment multiplexes the data of the logical channel into the determined physical layer resources.

In another embodiment, the network equipment may indicate the priorities of the physical layer resources via scheduling information.

Figure 8:
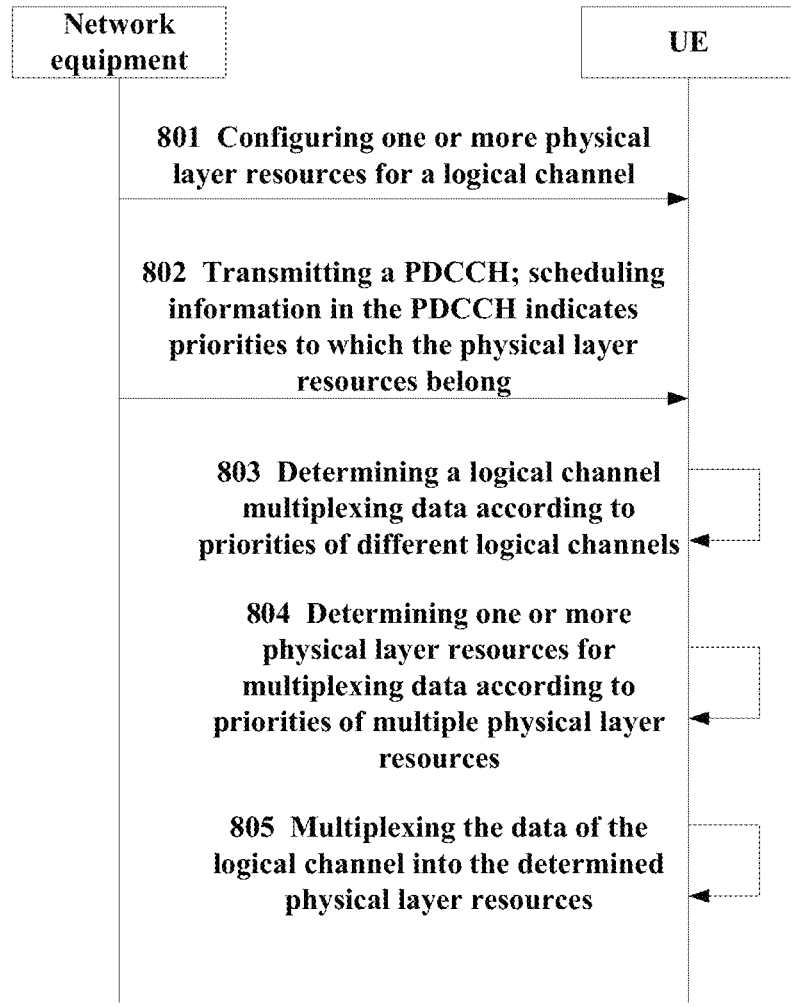
FIG. 8 is a further schematic diagram of the data multiplexing method of Embodiment 2 of this disclosure.

FIG. 8 is a further schematic diagram of the data multiplexing method of the embodiment of this disclosure, which shall be schematically described from the network equipment side and the user equipment side. As shown in FIG. 8, the method includes:

801: the network equipment configures one or more physical layer resources for the logical channel of the user equipment; the logical channel supports multiplexing data of different service types into the plurality of physical layer resources;

802: the network equipment transmitting a physical downlink control channel (PDCCH) to the user equipment; scheduling information (such as DCI) in the physical downlink control channel indicates priorities to which the physical layer resources belong.

803: the user equipment determines a logical channel performing data multiplexing according to priorities of different logical channels when there exist data in buffers of a plurality of logical channels needing to be transmitted;

804: for a determined logical channel, the user equipment determines one or more physical layer resources for multiplexing data on the logical channel according to priorities of the plurality of physical layer resources supported by the logical channel; and 805: the user equipment multiplexes the data of the logical channel into the determined physical layer resources.

In an embodiment, the priorities of the plurality of physical layer resources are configured according to time lengths of the physical layer resources. The time length may include a length of a transmission time interval of the physical layer resource, or the number of symbols occupied by the physical layer resource, or an absolute time length occupied by the physical layer resource; however, this disclosure is not limited thereto.

In an embodiment, the network equipment may configure a priority for a time length value of a physical layer resource, or configure a priority for an index corresponding to the time length value of a physical layer resource, or configure a priority for a value range of the time length value of a physical layer resource, or configure a priority for an index corresponding to the value range of the time length value of a physical layer resource, or configure priorities according to a sort of sizes of time lengths of the physical layer resources; however, this disclosure is not limited thereto.

It can be seen from the above embodiments that physical layer resources for multiplexing data are determined according to priorities of a plurality of physical layer resources supported by a logical channel. Hence, when the user equipment has data of a plurality of service types needing to be transmitted, the use of the resources by the user equipment may be kept in consistence with the scheduling intention of the network equipment.

Embodiment 3

These embodiments of this disclosure provide a data multiplexing apparatus, which may be a data transmitting device (such as a user equipment), or may be one or more parts or components configured in a user equipment. And contents in these embodiments identical to those in Embodiment 1 shall not be described herein any further.

Figure 9:
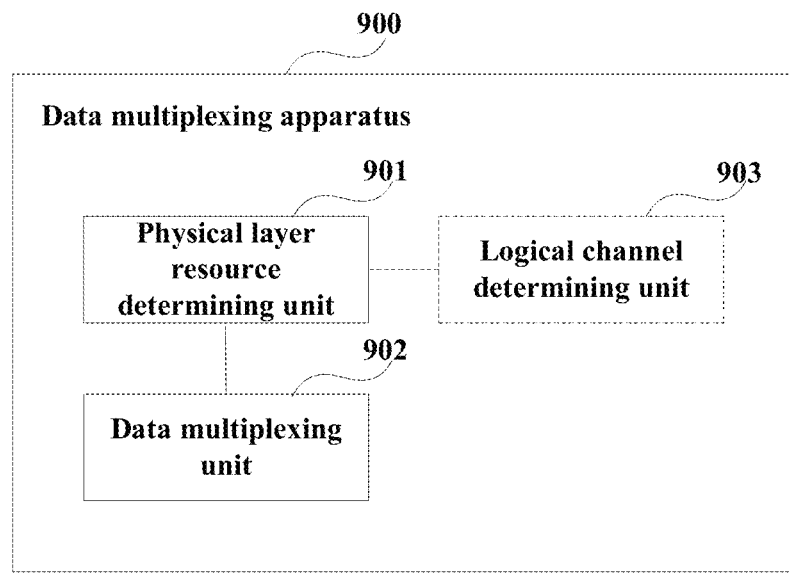
FIG. 9 is a schematic diagram of the data multiplexing apparatus of Embodiment 3 of this disclosure.

FIG. 9 is a schematic diagram of the data multiplexing apparatus of the embodiment of this disclosure. As shown in FIG. 9, the data multiplexing apparatus 900 includes:

a physical layer resource determining unit 901 configured to, for a logical channel needing to be performed data multiplexing, determine one or more physical layer resources for multiplexing data from a plurality of physical layer resources supported by the logical channel according to priorities of the plurality of physical layer resources; the logical channel supports to multiplex data of different service types into the plurality of physical layer resources; and a data multiplexing unit 902 configured to multiplex the data of the logical channel into the determined physical layer resources.

As shown in FIG. 9, the data multiplexing apparatus 900 may further include:

a logical channel determining unit 903 configured to, when there exist data needing to be transmitted in buffers of a plurality of logical channels, determine a logical channel performing data multiplexing according to priorities of different logical channels.

In an embodiment, the different physical layer resources may have different numerologies, and the different numerologies include different subcarrier spacings and/or symbol lengths; however, this disclosure is not limited thereto, and different physical layer resources may also have identical numerologies.

In an embodiment, the priority of the physical layer resource may be configured by a network equipment, or may be predefined in a protocol or a standard.

For example, the network equipment may configure, via signaling, the priorities of the plurality of physical layer resources corresponding to one or more logical channels or service types or radio connections; or the network equipment may configure corresponding priorities of the plurality of physical layer resources while establishing a logical channel or a service type or a radio connection; or the priorities of the plurality of physical layer resources corresponding to one or more logical channels or service types or radio connections are predefined in a protocol or a standard.

In an embodiment, the priority of the physical layer resource may be indicated by scheduling information transmitted by the network equipment. For example, the priority to which the physical layer resource belongs may be indicated by scheduling information (such as DCI) in a PDCCH transmitted by the network equipment.

In an embodiment, the priorities of the plurality of physical layer resources may be configured according to time lengths of the physical layer resources. The time length may include a length of a transmission time interval of the physical layer resource, or the number of symbols occupied by the physical layer resource, or an absolute time length occupied by the physical layer resource; however, this disclosure is not limited thereto.

In an embodiment, a priority may be configured or defined for a time length value of a physical layer resource; or a priority may be configured or defined for an index corresponding to the time length value of a physical layer resource; or a priority may be configured or defined for a value range of the time length value of a physical layer resource; or a priority may be configured or defined for an index corresponding to the value range of the time length value of a physical layer resource; or priorities may be configured or defined according to a sort of sizes of time lengths of the physical layer resources; however, this disclosure is not limited thereto.

It should be noted that the components or modules related to this disclosure are only illustrated above; however, this disclosure is not limited thereto. And the data multiplexing apparatus 900 may further include other components or modules, and reference may be made to the relevant art for particular contents of these components or modules It can be seen from the above embodiments that physical layer resources for multiplexing data are determined according to priorities of a plurality of physical layer resources supported by a logical channel. Hence, when the user equipment has data of a plurality of service types needing to be transmitted, the use of the resources by the user equipment may be kept in consistence with the scheduling intention of the network equipment.

Embodiment 4

These embodiments of this disclosure provide a configuration apparatus for data multiplexing, which may be a data receiving device (such as a network equipment), or may be one or more parts or components configured in a network equipment. And contents in these embodiments identical to those in embodiments 1 and 2 shall not be described herein any further.

Figure 10:
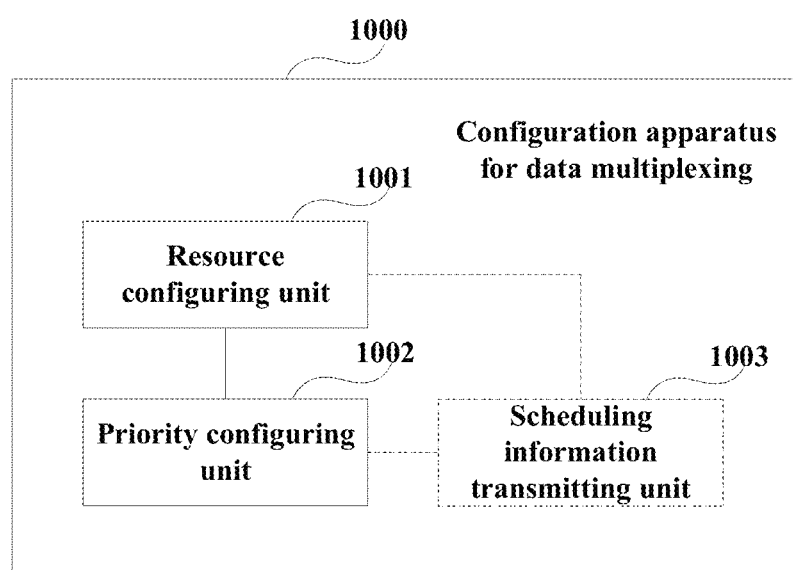
FIG. 10 is a schematic diagram of the configuration apparatus for data multiplexing of Embodiment 4 of this disclosure.

FIG. 10 is a schematic diagram of the configuration apparatus for data multiplexing of the embodiment of this disclosure. As shown in FIG. 10, the configuration apparatus 1000 includes:

a resource configuring unit 1001 configured to configure one or more physical layer resources for a logical channel of a user equipment; the logical channel supports to multiplex data of different service types into a plurality of physical layer resources; and a priority configuring unit 1002 configured to configure the physical layer resources with priorities or indicate priorities to the physical layer resources, so that the user equipment determines one or more physical layer resources for multiplexing data from the plurality of physical layer resources according to the priorities.

In an embodiment, the different physical layer resources may have different numerologies, and the different numerologies include different subcarrier spacings and/or symbol lengths; however, this disclosure is not limited thereto, and different physical layer resources may also have identical numerologies.

In one embodiment, the priority configuring unit 1002 may configure, via signaling, the priorities of the plurality of physical layer resources corresponding to one or more logical channels or service types or radio connections; or the priority configuring unit 1002 may configure corresponding priorities of the plurality of physical layer resources while establishing a logical channel or a service type or a radio connection.

In another embodiment, as shown in FIG. 10, the configuration apparatus 1000 may further include:

a scheduling information transmitting unit 1003 configured to transmit scheduling information to the user equipment; the priority of the physical layer resource is indicated by the scheduling information. The priority to which the physical layer resource belongs may be indicated by scheduling information (such as DCI) in a PDCCH transmitted by the scheduling information transmitting unit 1003.

In an embodiment, the priorities of the plurality of physical layer resources are configured according to time lengths of the physical layer resources. The time length may include a length of a transmission time interval of the physical layer resource, or the number of symbols occupied by the physical layer resource, or an absolute time length occupied by the physical layer resource; however, this disclosure is not limited thereto.

In an embodiment, the priority configuring unit 1002 may configure a priority for a time length value of a physical layer resource; or may configure a priority for an index corresponding to the time length value of a physical layer resource; or may configure a priority for a value range of the time length value of a physical layer resource; or may configure a priority for an index corresponding to the value range of the time length value of a physical layer resource;

or may configure priorities according to a sort of sizes of time lengths of the physical layer resources.

It should be noted that the components or modules related to this disclosure are only illustrated above; however, this disclosure is not limited thereto. And the configuration apparatus 1000 for data multiplexing may further include other components or modules, and reference may be made to the relevant art for particular contents of these components or modules.

It can be seen from the above embodiments that physical layer resources for multiplexing data are determined according to priorities of a plurality of physical layer resources supported by a logical channel. Hence, when the user equipment has data of a plurality of service types needing to be transmitted, the use of the resources by the user equipment may be kept in consistence with the scheduling intention of the network equipment.

Embodiment 5

These embodiments of this disclosure provide a communication system, reference being able to be made to FIG. 1, and contents identical to those in embodiments 1-4 being not going to be described herein any further. In these embodiments, the communication system 100 may include:

a user equipment 102 configured with the data multiplexing apparatus 900 as described in Embodiment 3; and a network equipment 101 configured with the configuration apparatus 1000 for data multiplexing as described in Embodiment 4.

The embodiment of this disclosure further provides a user equipment; however, this disclosure is not limited thereto, and may also be other devices.

Figure 11:
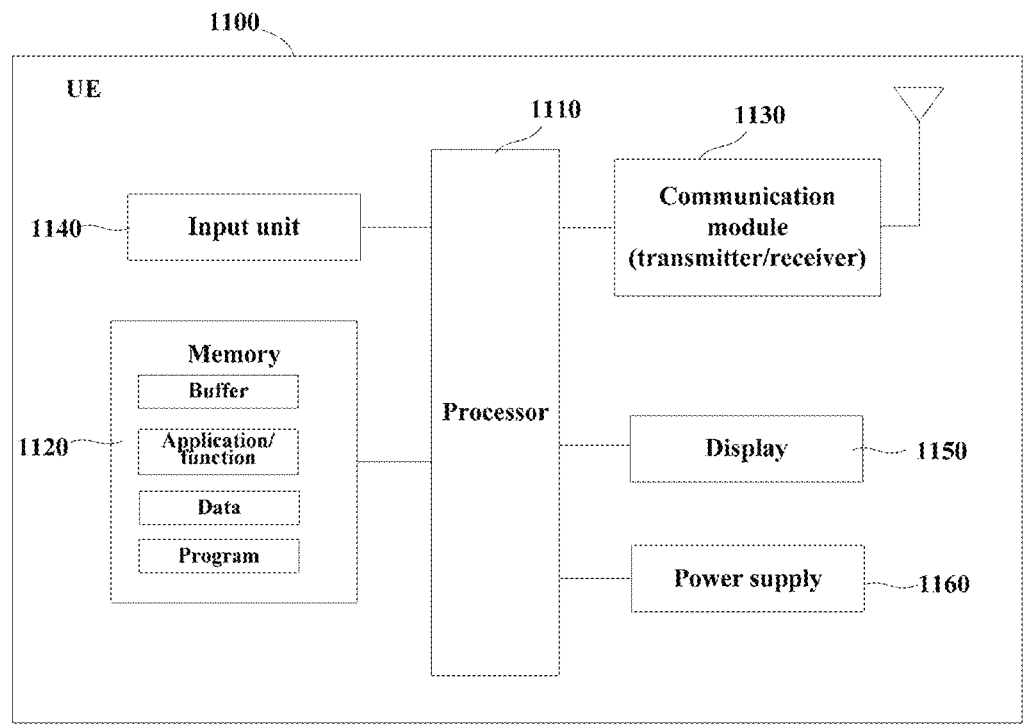
FIG. 11 is a schematic diagram of the user equipment of Embodiment 5 of this disclosure.

FIG. 11 is a schematic diagram of the user equipment of the embodiment of this disclosure. As shown in FIG. 11, the user equipment 1100 may include a processor 1110 and a memory 1120, the memory 1120 storing data and programs and being coupled to the processor 1110. It should be noted that this figure is illustrative only, and other types of structures may also be used, so as to supplement or replace this structure and achieve a telecommunications function or other functions.

The processor 1110 may be configured to execute the functions of the data multiplexing apparatus 900. For example, the processor 1110 may be configured to perform the following control: for a logical channel needing to be performed data multiplexing, determining one or more physical layer resources for multiplexing data from a plurality of physical layer resources supported by the logical channel according to priorities of the plurality of physical layer resources; the logical channel supports to multiplex data of different service types into the plurality of physical layer resources; and multiplexing the data of the logical channel into the determined physical layer resources.

As shown in FIG. 11, the user equipment 1100 may further include a communication module 1130, an input unit 1140, a display 1150 and a power supply 1160. Functions of the above components are similar to those in the relevant art, and shall not be described herein any further. It should be noted that the user equipment 1100 does not necessarily include all the parts shown in FIG. 11, and the above components are not necessary; and furthermore, the user equipment 1100 may include parts not shown in FIG. 11, and the relevant art may be referred to.

The embodiment of this disclosure further provides a network equipment, such as a base station; however, this disclosure is not limited thereto, and may also be other network equipments.

Figure 12:
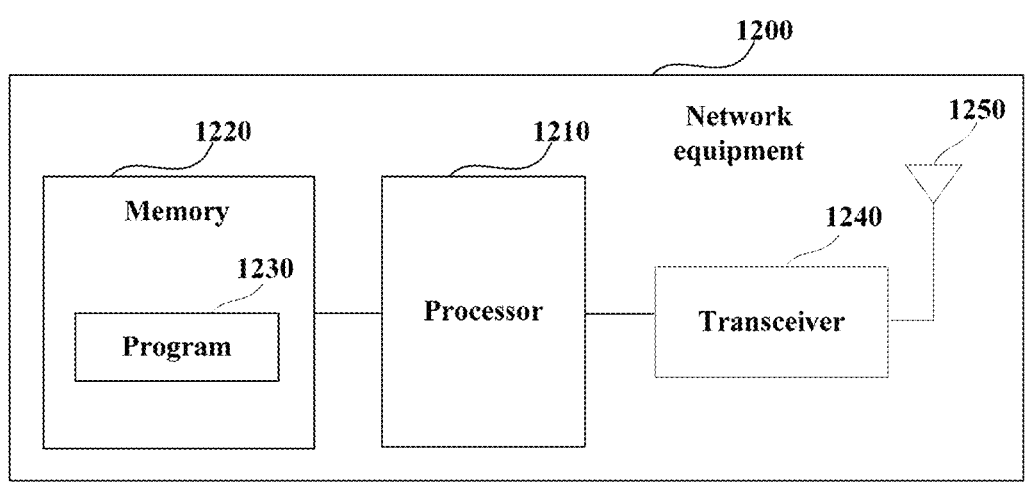
FIG. 12 is a schematic diagram of the network equipment of Embodiment 5 of this disclosure.

FIG. 12 is a schematic diagram of a structure of the network equipment of the embodiment of this disclosure. As shown in FIG. 12, the network equipment 1200 may include a processor 1210 (such as a central processing unit (CPU)) and a memory 1220, the memory 1220 being coupled to the processor 1210. The memory 1220 may store various data, and furthermore, it may store a program 1230 for data processing, and execute the program 1230 under control of the processor 1210.

The processor 1210 may be configured to execute the functions of the configuration apparatus 1000 for data multiplexing. For example, the processor 1210 may be configured to execute the program 1230 to perform the following control: configuring one or more physical layer resources for a logical channel of a user equipment; the logical channel supports to multiplex data of different service types into a plurality of physical layer resources; and configuring the physical layer resources with priorities or indicating priorities to the physical layer resources, so that the user equipment determines one or more physical layer resources for multiplexing data from the plurality of physical layer resources according to the priorities.

Furthermore, as shown in FIG. 12, the network equipment 1200 may include a transceiver 1240, and an antenna 1250, etc. Functions of the above components are similar to those in the relevant art, and shall not be described herein any further. It should be noted that the network equipment 1200 does not necessarily include all the parts shown in FIG. 12, and furthermore, the network equipment 1200 may include parts not shown in FIG. 12, and the relevant art may be referred to.

An embodiment of the present disclosure provides a computer readable program code, which, when executed in a transmitting device or a user equipment, will cause the transmitting device or the user equipment to carry out the data multiplexing method as described in Embodiment 1.

An embodiment of the present disclosure provides a computer readable medium, including a computer readable program code, which will cause a transmitting device or a user equipment to carry out the data multiplexing method as described in Embodiment 1.

An embodiment of the present disclosure provides a computer readable program code, which, when executed in receiving device or a network equipment (such as a base station), will cause the receiving device or the network equipment (such as a base station) to carry out the configuration method for data multiplexing as described in Embodiment 2.

An embodiment of the present disclosure provides a computer readable medium, including a computer readable program code, which will cause a receiving device or a network equipment (such as a base station) to carry out the configuration method for data multiplexing as described in Embodiment 2.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 9 may either correspond to software modules of procedures of a computer program, or correspond to hardware modules. Such software modules may respectively correspond to the steps shown in FIG. 2. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the accompanying drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the accompanying drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A data multiplexing apparatus, comprising:
a memory that stores a plurality of instructions; and
a processor coupled to the memory and configured to execute the instructions to:
for a logical channel needing to be performed data multiplexing, determine one or more physical layer resources for multiplexing data from a plurality of configured or scheduled physical layer resources, or both, supported by the logical channel according to priorities of the plurality of physical layer resources, wherein the logical channel supports to multiplex data of a service type into the plurality of physical layer resources, the priorities of the plurality of physical layer resources indicated by scheduling information of the physical layer resources; and
multiplex the data of the logical channel into the determined physical layer resources.

2. The data multiplexing apparatus according to claim 1, wherein the processor is further configured to, when there exist data needing to be transmitted in buffers of a plurality of logical channels, determine a logical channel performing data multiplexing according to priorities of different logical channels.

3. The data multiplexing apparatus according to claim 1, wherein the scheduling information is downlink control information in a physical downlink control channel transmitted by a network equipment, the priority of the physical layer resource being indicated by the downlink control information.

4. The data multiplexing apparatus according to claim 1, wherein the logical channel is one of a plurality of logical channels, the plurality of logical channels comprising at least two logical channels correspond to different service types.

5. A configuration apparatus for data multiplexing, comprising:
a memory that stores a plurality of instructions;
a processor coupled to the memory and configured to execute the instructions to:
configure one or more physical layer resources for a logical channel of a user equipment, wherein, the logical channel supports to multiplex data of a service type into a plurality of physical layer resources; and
configure the physical layer resources with priorities or indicate priorities to the physical layer resources, the priorities are used by the user equipment to determine one or more physical layer resources for multiplexing data from the plurality of physical layer resources; and
a transmitter configured to transmit scheduling information to the user equipment, wherein the priority of the physical layer resource is indicated by the scheduling information.

6. The configuration apparatus according to claim 5, wherein the scheduling information is downlink control information in a physical downlink control channel transmitted by the transmitter, the priority of the physical layer resource being indicated by the downlink control information.

7. The configuration apparatus according to claim 5, wherein the logical channel is one of a plurality of logical channels, the plurality of logical channels comprising at least two logical channels correspond to different service types.

8. A communication system, comprising:
a user equipment configured to, for a logical channel needing to be performed data multiplexing, determine one or more physical layer resources for multiplexing data from a plurality of physical layer resources supported by the logical channel according to priorities of the plurality of physical layer resources, wherein the logical channel supports to multiplex data of different service types into the plurality of physical layer resources, the priorities of the plurality of physical layer resources indicated by scheduling information of the physical layer resources and multiplex the data of the logical channel into the determined physical layer resources; and a network equipment configured to configure one or more physical layer resources for a logical channel of the user equipment, configure the physical layer resources with priorities or indicate priorities to the physical layer resources, and transmit scheduling information to the user equipment wherein the priority of the physical layer resource is indicated by the scheduling information.

* * * * *